United States Patent [19]

Noe

[11] Patent Number: 4,789,077

[45] Date of Patent: Dec. 6, 1988

[54] CLOSURE APPARATUS FOR A HIGH PRESSURE VESSEL

[75] Inventor: Renato R. Noe, Union City, N.J.

[73] Assignee: Public Service Electric & Gas Company, Newark, N.J.

[21] Appl. No.: 159,924

[22] Filed: Feb. 24, 1988

[51] Int. Cl.[4] .............................................. B65D 45/32
[52] U.S. Cl. ....................................... 220/319; 220/3; 220/254; 292/256.6
[58] Field of Search .................... 220/3, 254, 319, 315; 292/256.6

[56] References Cited

U.S. PATENT DOCUMENTS

| | | | |
|---|---|---|---|
| 2,009,877 | 7/1935 | Dodd | 220/3 |
| 2,196,895 | 4/1940 | Bowman | 220/55 |
| 2,224,004 | 12/1940 | Rudd | 62/91.5 |
| 2,226,495 | 12/1940 | Jacocks . | |
| 2,258,804 | 10/1941 | Pfleumer . | |
| 2,273,186 | 2/1942 | Fischer | 220/3 |
| 2,711,266 | 6/1955 | Kopp . | |
| 3,185,337 | 3/1965 | Long . | |
| 3,437,230 | 4/1969 | Savory . | |
| 3,552,789 | 1/1971 | Evans | 292/256.6 |
| 3,695,482 | 10/1972 | Smith . | |
| 3,874,814 | 4/1975 | Carroll et al. | 415/219 |
| 3,934,752 | 1/1976 | Ravicchio et al. | 220/328 |
| 4,140,240 | 2/1979 | Platts | 220/319 |
| 4,351,450 | 9/1982 | Summerfield | 220/319 |
| 4,470,516 | 9/1984 | Tsou | 220/319 |
| 4,512,496 | 4/1985 | Tsou | 220/319 |
| 4,565,297 | 1/1986 | Korner et al. | 220/254 |

*Primary Examiner*—George T. Hall
*Attorney, Agent, or Firm*—Kenyon & Kenyon

[57] ABSTRACT

Closure apparatus for a high pressure vessel includes a closure member having a hemispherically concave interior and a stepped cylindrical exterior portion. The stepped cylindrical exterior portion is adapted to complement the cross-sectional shape of flanged sector blocks so that the sector blocks are lockingly engaged in a circumferential groove in an access opening of the high pressure vessel when the closure member is installed, thereby eliminating any requirement for a wedge ring support for the blocks. The present closure apparatus may be retrofitted into high pressure vessels already equipped with a much heavier flat plate closure. The present closure apparatus may be of the partial access type, an elliptical manway being provided in the closure member. Access through the manway allows periodic maintenance of the vessel interior without having to remove the heavy closure member.

12 Claims, 8 Drawing Sheets

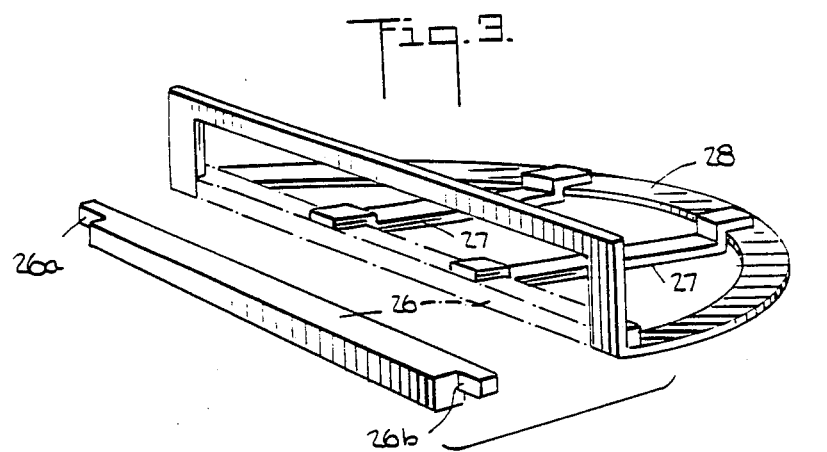
Fig. 3.
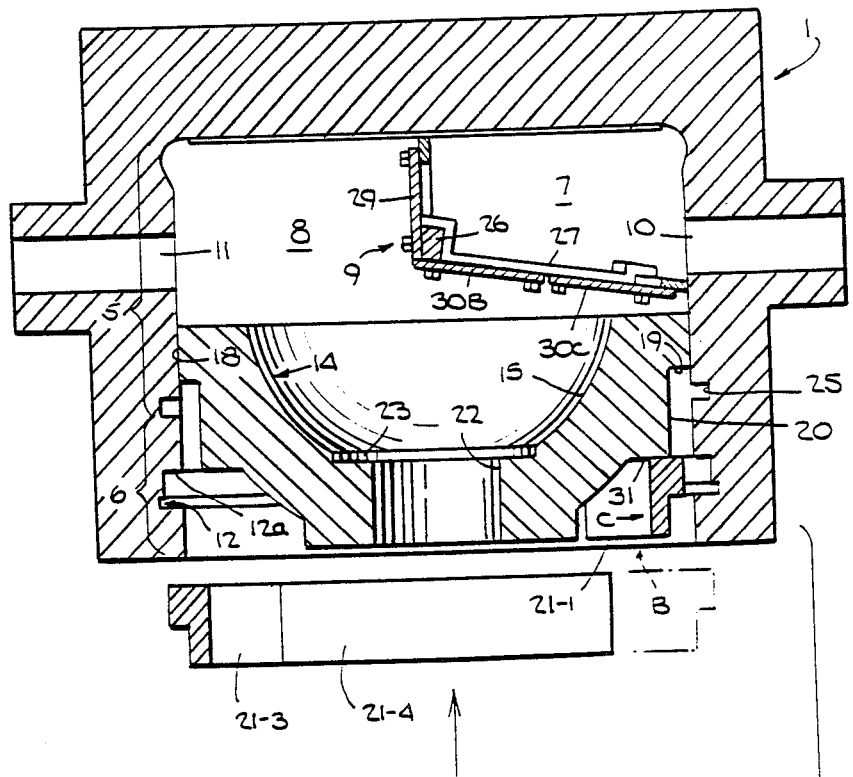
Fig. 4.
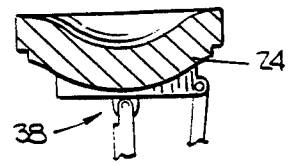

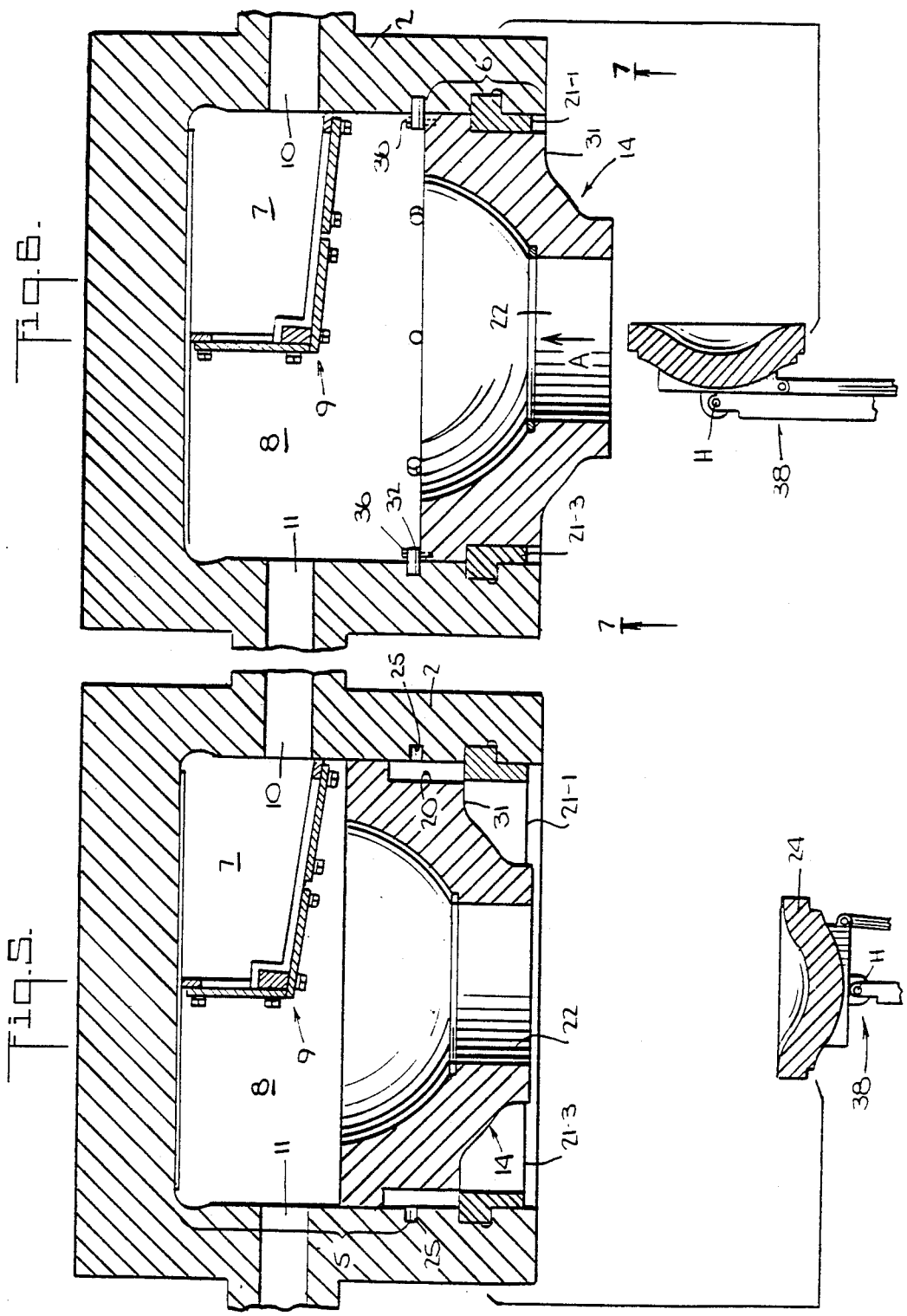

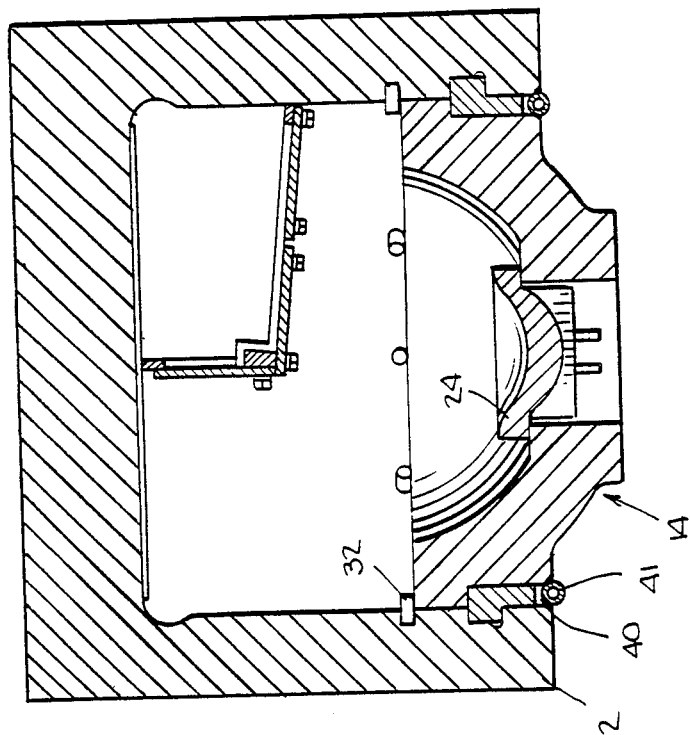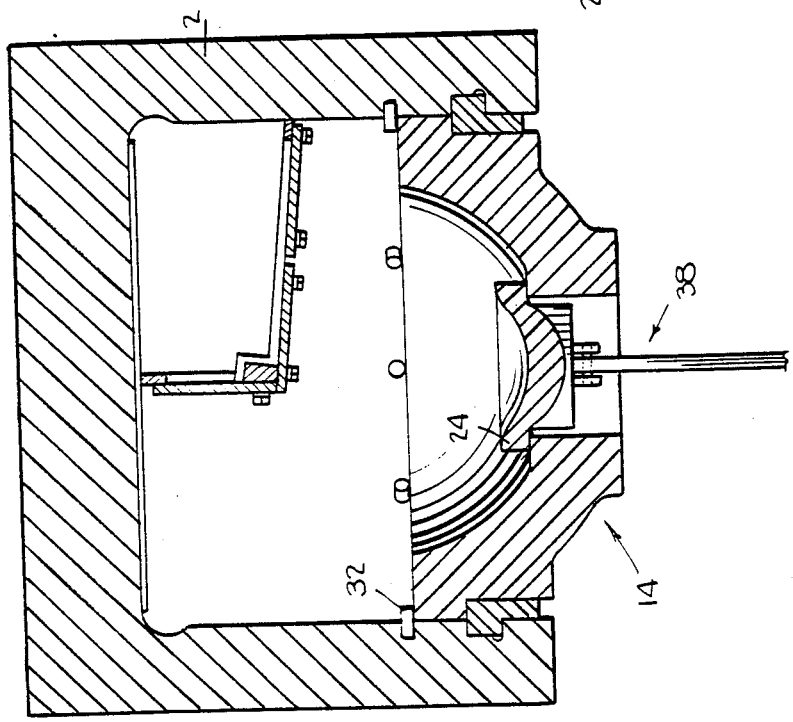

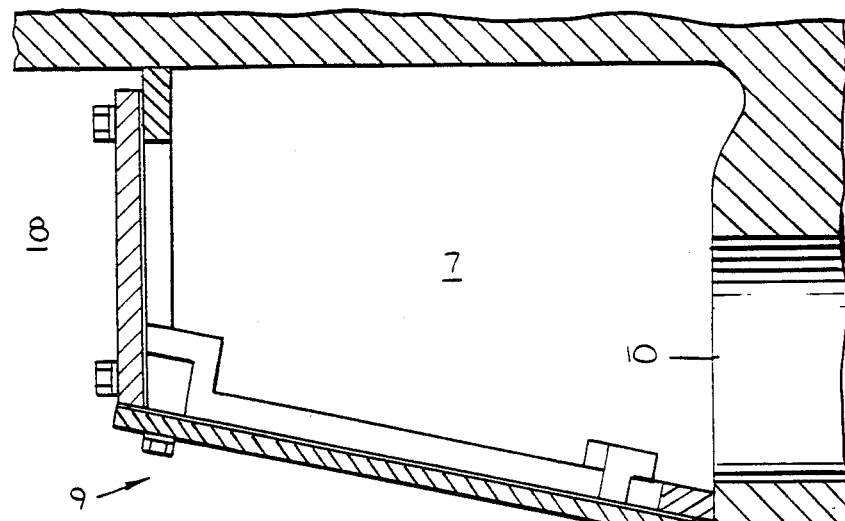
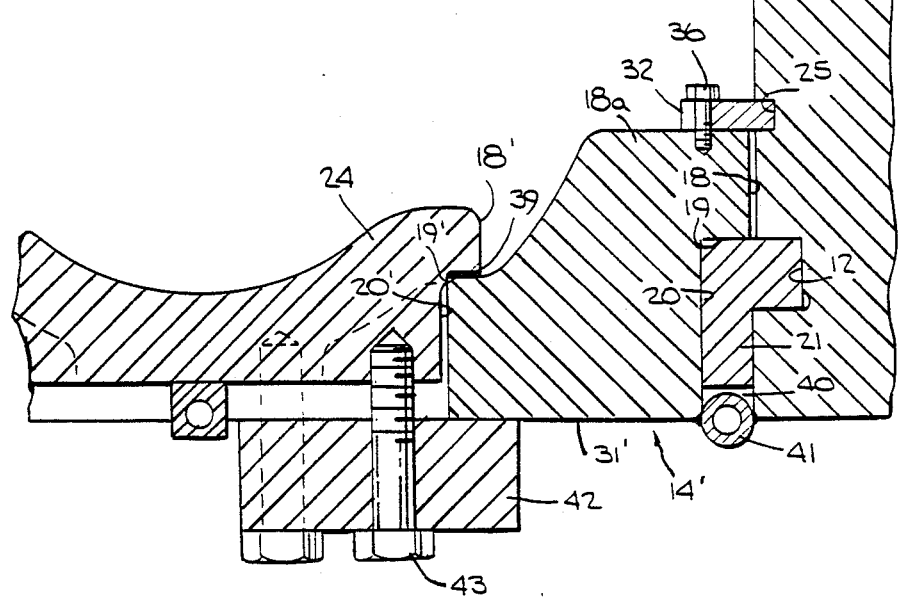
Fig. 12.

CLOSURE APPARATUS FOR A HIGH PRESSURE VESSEL

BACKGROUND OF THE INVENTION

1. Technical Field

The present invention relates to the design of closure apparatus for high pressure vessels and, more particularly, to a closure providing both full and partial access.

2. Description of the Prior Art.

The design and operation of high pressure feedwater heaters in modern steam generating plants are subject to several constraints. Typical operating pressures on a high pressure side of such heaters in the range of 3,000–5,000 pounds per square inch (1,065–1,775 N/cm$^2$) require thick walls, and, consequently, heavy structures. The need for access to inspect and replace feedwater tubes makes it desirable to have closures for high pressure vessels of such heaters that are relatively easy to remove and replace. Unfortunately, improved ease of access is usually accompanied by increased weight and complexity.

Conventional feedwater heaters are usually cylindrical shell and tube heat exchangers in which a bundle of many tubes is enclosed by a cylindrical shell. The tubes may either extend straight between tube sheets located at opposite ends of the shell, or they may be bent into a U-shape so that the inlet and outlet ends of each tube terminate in a single tube sheet. The interior of the tubes is usually the high pressure side of the heater; consequently, the shell wall can be relatively thin. The heavy construction can be limited to two end chambers (in the case of straight tube construction) or to a single end chamber (in the case of a U-tube construction). These end chambers, whether single or double, comprise high pressure vessels and are provided with inlet and outlet connections for the high pressure feedwater that flows through the tubes. The chambers, also called channels, are cylindrical, with an inner diameter large enough to provide full access to all the tube penetrations through the tube sheet. Because the wall thickness of the cylindrical high pressure end chamber is proportional to the diameter, for a given pressure, the internal diameter of the channel should be as small as is consistent with the need to gain access to the tubes. By way of example, a typical interior diameter of a feedwater heater channel is thirty-six inches, the thickness of the annular wall of the channel is eight and one-half inches, and the operating pressure is five thousand pounds per square inch.

In the petrochemical industry, high pressure vessels are employed in the refining and in the transmission of liquid petrochemical products. Such high pressure vessels may not be subject to the extreme thermal stress of high pressure steam generating plants. On the other hand, such high pressure vessels typically must withstand operating pressures in the range of 8000 pounds per square inch. Furthermore, it is equally desirable in the petrochemical industry to provide closures that are relatively easy to remove and replace.

There are two types of closures conventionally provided for such high pressure vessels, known as full access and partial access. The full access type is usually a circular flat disc or plate that fits slidably into the channel and is secured by sector pieces or blocks that fit into an inner circumferential groove in the channel wall. An example of this type of closure is shown in U.S. Pat. No. 4,463,871 of Garbarini et al., the disclosure of which is incorporated herein by reference.

The partial access type of closure is usually a hemispherical head that is butt-welded to the end of the channel wall and is provided with a concentric manway. The manway may have a bolted cover, or, if it has an elliptical cross section, it may have an internal closure which makes use of the internal pressure in the vessel to provide a leak-tight seal.

The partial access closure has the advantage that the relatively small manway cover can be removed quickly and easily to permit periodic inspection and preventive maintenance, for example, of the tubes in feedwater heater installations. If extensive repair or replacement of the tubes is needed, however, the hemispherical head has to be removed by cutting away the butt weld. After completion of the repairs, the head must be rewelded and the weld thoroughly inspected. This procedure is time-consuming and expensive.

The flat plate full access closure has the converse drawback that it must be removed even for a routine inspection. The flat plate closure is approximately twice as heavy as a hemispherical head of the same diameter, because the flat plate is subjected to principally bending stresses whereas the hemispherical head is loaded primarily in tension. Thus, for a 5,000 psi pressure chamber having a threefoot diameter channel opening, the closure plate may weigh six tons, and the individual sector pieces may be 200 pounds apiece. Removal and reassembly of the closure requires a large crew and special staging and equipment. Consequently, routine inspection and preventive maintenance involve considerably more expense than the hemispherical head, which has only a relatively small manway cover to handle. As a result, the period between inspections tends to be extended for feedwater heaters having a flat plate full access closure, giving more time for small problems to become large ones.

It would be desirable to have a closure that provides the advantages of both the full access and partial access types. The flat plate closure, however, does not permit enough space between the inner face of the plate and the opposed face of the tube sheet to allow full inspection even if a manway were provided through the cover. The spherical outer surface of the hemispherical closure, on the contrary, does not provide enough radial space to maneuver the sector pieces into position and to secure them in place with a wedge ring as used with the flat plate closure.

SUMMARY OF THE INVENTION

The problems with prior art flat plate and hemispherical closures are solved by the principles of the present invention, which incorporates the advantages of both, with a simpler arrangement than either.

The present invention comprises a closure member having a hemispherically shaped interior wall but having a stepped cylindrical exterior wall portion adapted to engage flanged sector pieces having, for example, an approximately L-shaped cross section. Each sector piece comprises a segment of a ring, as is taught by the prior art, but the novel cross-sectional shape in combination with the stepped cylindrical shape of the exterior of the closure member eliminates any need for a wedge ring to hold the blocks in place.

The closure member is inserted into the channel of the vessel far enough to provide space for insertion of the flanges of the sector blocks into a circumferential groove in the channel wall. Upon retracting the closure until an annular shoulder bears against the angular sector pieces, a cylindrical surface extending from the annular shoulder of the closure member locks against the inner surfaces of the sector pieces, securing the pieces in place. By this locking engagement, there is no need for a separate wedge ring as with a flat plate closure.

A partial access closure is created by providing an elliptical opening and insertable elliptical lid for access to the interior of the channel. A typical diameter of a high pressure channel being three feet, a manway opening approximately fourteen inches by eighteen inches permits entry for inspection and maintenance purposes. Locking pins, inserted and installed through this manway, may be used to prevent the closure from being forced inward if the interior of the high pressure vessel is subjected to a vacuum. Furthermore, the installation or repair of a frame and plate partition arrangement for separating the inlet and outlet portions of the feedwater heater is also possible by way of this manway.

BRIEF DESCRIPTION OF THE DRAWINGS

FIG. 4 is a view similar to FIG. 1 showing the closure member inserted sufficiently into the channel to provide room for placement of the flanged sector blocks into a circumferential locking groove in the channel of the high pressure chamber;

FIG. 6 is a view similar to FIG. 1 showing the closure member retracted into locking engagement with the sector blocks and locking pins secured in place to prevent subsequent movement of the closure member toward the interior of the vessel;

FIGS. 8A, 8B, and 8C show alternative arrangements of providing an O-ring seal between the side wall of the vessel channel and the closure member;

FIG. 9 is a perspective partially cut away view of the closure member inserted into the channel of the vessel and with means for inserting an elliptical manway lid through an opening in the bottom wall of the closure member;

FIG. 10 shows a longitudinal cross-sectional view similar to FIG. 1, the elliptical lid lowered into place to fully seal the elliptical opening, with the insertion means still attached to the lid;

FIG. 11 is a longitudinal cross-sectional view similar to FIG. 10 wherein the insertion means has been removed and including a welded torus ring seal of the annular space between the closure member and the channel of the vessel;

FIG. 12 is a partial cross-sectional view of an alternative embodiment of the closure member in finally installed condition;

DETAILED DESCRIPTION

Figure 1:
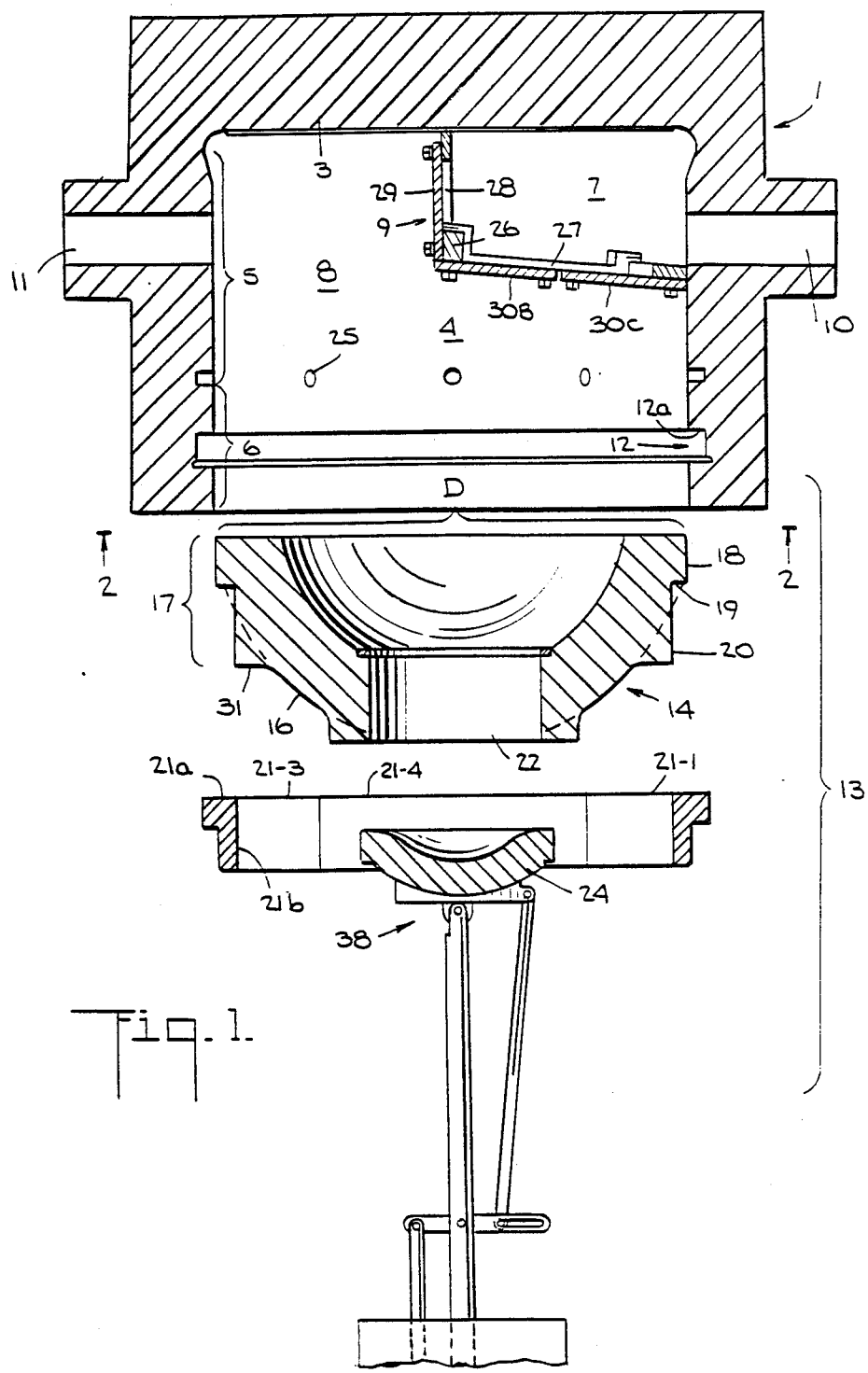
FIG. 1 is an exploded longitudinal cross-sectional view of a combined full and partial access pressure vessel closure arrangement in an unassembled condition, according to the present invention, showing a high pressure chamber of a conventional heat exchanger vessel, an end closure apparatus having a hemispherically-contoured interior and a stepped cylindrical exterior portion, and a plurality of flanged sector pieces or blocks of L-shaped cross section.

Throughout the drawings the same reference characters are used to denote identical elements. Referring more particularly to FIG. 1, a lower end of a conventional high pressure heat exchanger vessel 1 has a cylindrical wall 2 extending from a flat tube sheet 3 to form a high pressure channel 4, which has an upper portion 5 and a lower portion 6.

The use of directional terms such as upper and lower is for convenience only. They are chosen to relate to the usual orientation of high pressure heat exchangers in electric power plants, but such orientation is not required. The invention applies equally to closure assemblies mounted in vessel openings having any orientation. In addition, to simplify the drawings, the heat exchanger tubes that pierce the tube sheet 3 and the shell surrounding the tubes are not shown, since these elements are completely conventional.

The upper channel portion 5 is divided into a first chamber 7 and a second chamber 8 by a frame and plate partition 9. There is an inlet or outlet port 10 for the first chamber 7 and a corresponding outlet or inlet port 11 for the second chamber 8. In the wall of the lower portion 6 of the channel 4, a circumferential locking groove 12 is normally provided.

One embodiment of a closure apparatus 13 in accordance with the present invention is shown for closing channel portion 6 of high pressure vessel 1. According to FIG. 1, the closure apparatus 13 comprises a closure member 14 having a hemispherically contoured interior surface 15 and an exterior surface 16 that is generally hemispherical (see dashed line), except for a modified portion 17 having a stepped cylindrical shape. The stepped cylindrical shape comprises an outer rim 18, an annular surface 19, and a reduced diameter portion 20. The annular surface 19 and reduced diameter portion 20 are adapted to conform to inner faces 21a and 21b of flanged sector blocks 21A, 21B, 21C, and 21D (see FIG. 7), which have substantially L-shaped cross sections. The rim diameter D of the closure member 14 is slightly smaller than the interior diameter of the channel 4 to allow the closure member 14 to be inserted telescopically into the lower channel portion 6.

From the longitudinal cross-sectional view of the closure member 14, it can be seen that the stepped cylindrical portion approximates a true hemispherical shape. The stepped cylindrical portion adds very little material, yet it locks in place the flanged sector shear pieces which conform to the surfaces 18, 19 and 20 of the closure member 14, without the need for a separate wedge ring.

The closure apparatus 13 is altogether approximately half the weight of a flat plate closure of the same diameter and pressure rating and approximately the same weight as a butt-welded type of hemispherical closure. Only minor variations from the hemispherical surface 16 are required to conform closure member 14 to flanged sector blocks 21 of substantially L-shape. Each shoulder formed by the stepped deviations from hemispherical surface 16 may be provided with rounded edges having a predetermined fillet radius to relieve stress. Computer stress analysis of the region of the shoulder between rim surface 18 and cylindrical surface 20 has demonstrated that the stepped cylindrical contour is as strong as a hemispheric contour following line 16.

The closure member 14 is provided with a central elliptical manway opening 22 having an inner seat 23. A minimum size elliptical manway opening 22 has minor and major dimensions of, for example, fourteen inches and eighteen inches, respectively. This view shows the minor dimension of opening 22, the major dimension being perpendicular to the plane of the drawing. An elliptical lid 24 having a major dimension as shown in FIG. 1 can be inserted and dropped into sealing engagement with inner seat 23, the elliptical lid 24 being slightly larger than the elliptical opening 22 so as to bear against the inner seat 23. The insertion procedure will be described in greater detail in the discussion of FIGS. 10 through 12.

The interior cylindrical channel wall 2 of the high pressure vessel 1 has radial blind holes 25 drilled in circumferentially spaced fashion around the interior of the channel. The function of these holes 25 will be more completely described in the discussion of FIGS. 7 and 8.

Figure 2:
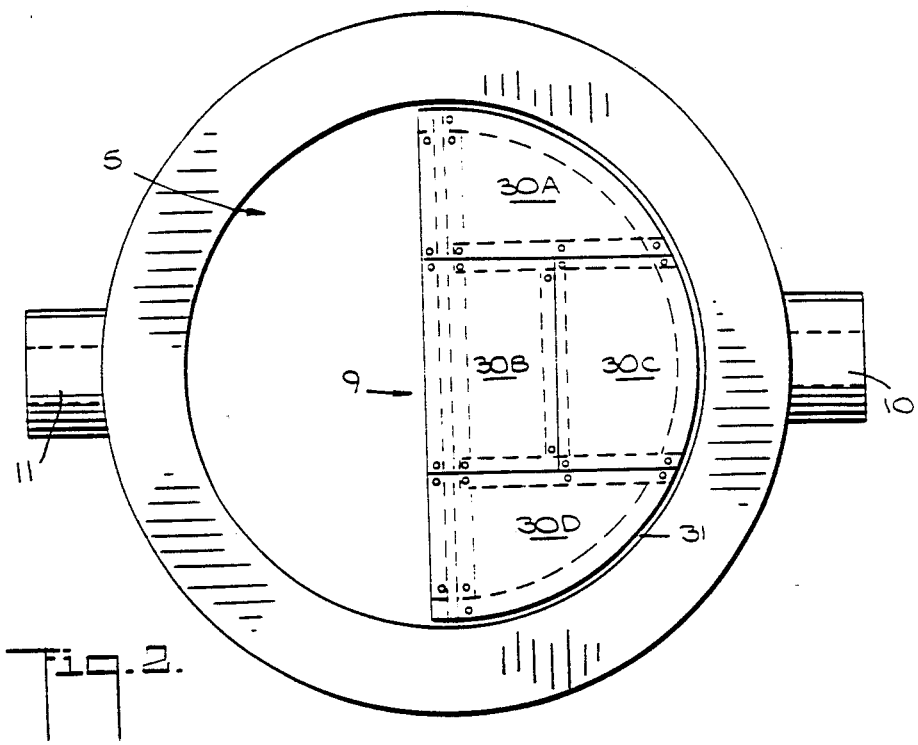
FIG. 2 is an end view of the high pressure chamber of the heat exchanger vessel, in the direction of arrows 2—2 in FIG. 1, showing a frame and plate construction for dividing inlet and outlet portions of the interior chamber.

Now with the aid of FIGS. 2 through 12 it will be described how the closure apparatus of the invention is installed in a conventional high pressure vessel 1. FIG. 2 shows the open end of the channel of the vessel 1, through which may be inserted frame pieces 26, 27 which interlock with fixed rim member 28 and to which are fastened plate members 29 and 30A, 30B, 30C, 30D to form the frame and plate partition 9 that separates first and second chambers 7 and 8.

Figure 3:
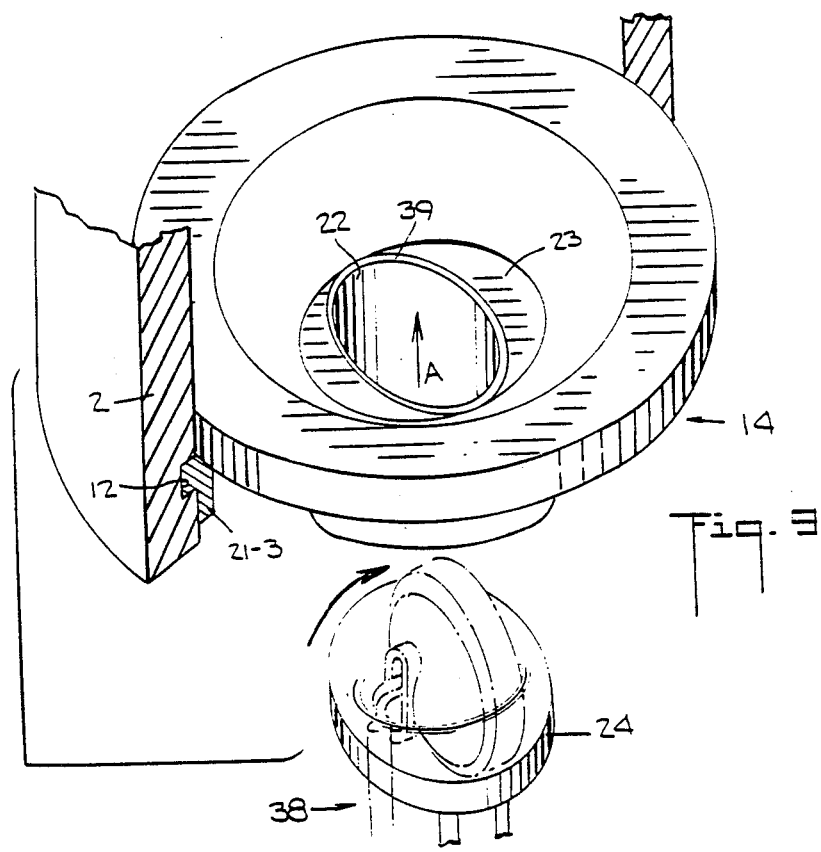
FIG. 3 is a partially exploded perspective view of a partially assembled frame and plate structure of FIG. 2 showing details of interlocking frame members of the structure.

Referring particularly to FIGS. 2 and 3, individual frame pieces 26 and 27 are so constructed that by fastening the plate members 29 and 30A, 30B, 30C, 30D to the frame pieces and to rim member 28, the plate members are tightly secured in place with a minimum of nut and bolt or other fasteners. In particular, frame piece 26 has offset longitudinal extensions 26a, 26b that lockingly engage rim member 28 that is welded to the surfaces 2 and 3 (see FIG. 1). Frame pieces 27 have offset ends 27a, 27b that rest on piece 26 and rim member 28.

FIG. 4 is a longitudinal cross-sectional view showing the vessel 1 with the frame and plate partition 9 already assembled. An arrow shows how the closure member 14 is inserted first through the open-ended channel lower portion 6 and then into upper portion 5 until the outer shoulder of the stepped cylindrical portion 17 clears to provide room for placement of the sector blocks in position for insertion into the circumferential groove 12 of the lower channel portion 6, as shown, in particular, by arrows B and C with reference to sector block 21-1. Blocks 21-2, 21-3, and 21-4 are installed next, in that order.

Figure 7:
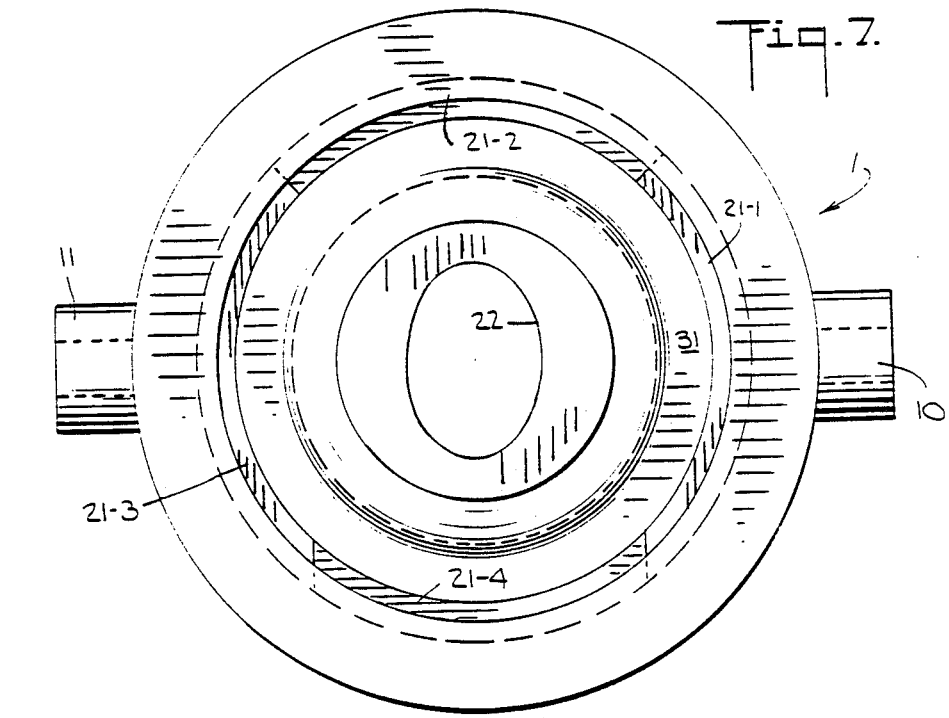
FIG. 7 is an end view in the direction of arrows 7—7 of the partially assembled closure member shown in FIG. 6.

As shown more clearly in the end view of FIG. 7, one sector block 21-4 has two parallel end faces, and the adjacent sector blocks 21-1 and 21-3 have mating end faces, to permit insertion of the sector block 21-4 with the parallel end faces after the other blocks are in place.

Figures 5A, 5B, 5C:
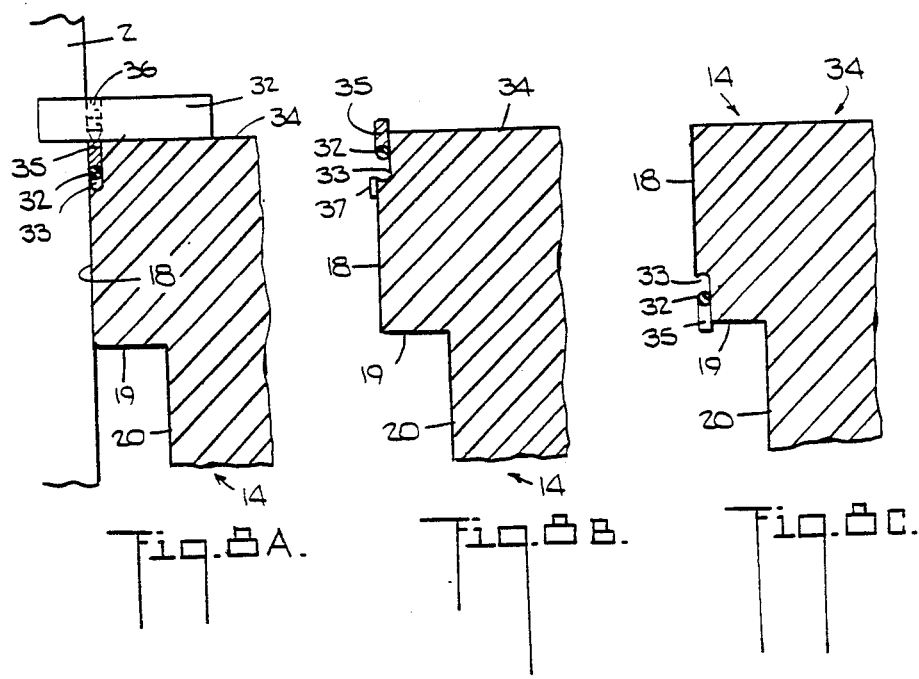
FIG. 5 is a view similar to FIG. 1 showing the flanged sector blocks fitted into the circumferential locking groove of the channel.

In FIG. 5, the flanges of the sector blocks have been inserted into the circumferential groove 12. Closure member 14 must remain fully inserted into upper channel portion 5 until installation of all the blocks is completed. Then FIG. 6 shows the closure member retracted against, and locked in place by, the flanged sector blocks in position in the groove 12 of the lower channel portion 6.

Comparison of the fully inserted position of the closure member in FIG. 5 with the retracted and locked position in FIG. 6 shows that the channel must provide axial space sufficient to allow insertion of the closure member beyond the lower portion 6 by a distance at least equal to the axial length of reduced diameter portion 20. This additional distance of insertion brings a flat annular face 31, that forms the outer end of portion 20, even with the inner end of circumferential groove in the channel. The radial clearance provided by face 31 is enough to allow each sector block to be inserted into the channel into abutment with face 31 and then to be moved laterally to install the flange portion in the groove and to fit the outer circumference of the arcuate cylindrical portion against the inner surface of the channel.

When the closure member is then withdrawn into locked position, the inner circumference of each sector block is supported for its full axial length by reduced diameter portion 20. Thus, the sector blocks fit snugly between the channel and the closure member. This close support of the entire L-shaped cross section of the sector blocks prevents any cocking or twisting movement of the flanges in the groove and ensures that the flanges will be loaded purely in shear.

The additional axial space needed for the closure member beyond its locked position in the channel, to permit the sector blocks to be installed, is available even in already existing high pressure heat exchangers that are equipped with conventional flat disk closures, because the axial thickness of the rim portion 18 of the closure of this invention can be much less than the thickness of the flat disk style of closure for a given opening size and vessel design pressure. Consequently, combination partial access/full access closure structures as described above can be retrofitted easily in existing pressure vessels having conventional flat disk closure members that do not permit convenient partial access for inspection and minor repairs.

FIGS. 8A, 8B, and 8C show alternative arrangements of a sealing engagement by means of an O-ring 32 between the closure member 14 with the inner surface of the channel wall 2. A groove 33 for receiving the O-ring in rim portion 18 of closure member 14 is configured in accordance with the teaching of U.S. Pat. No. 4,463,871, the disclosure of which is incorporated herein by reference. In FIGS. 8A and 8B the groove 33 is located at the upper end of rim 18 and opens into upper face 34 of the closure member. The groove 33 in FIG. 8C is located at the lower end of rim 18 and opens into annular surface 19 of the stepped cylindrical portion of the closure member.

With particular reference to FIG. 8A, the O-ring 32 is inserted in the groove 33 after the closure structure 14 has been lowered into place against the sector blocks. The installer gains access through the manway 22 and fits the O-ring 32 and a stainless steel guard ring 35 into the groove 33. The guard ring prevents the O-ring from blowing out of the groove 33 if the internal pressure falls below atmospheric pressure during cooldown, yet it allows ready access to change the O-ring via the manway, without removing the closure member 14. He then inserts stop pins 32 into the holes 25 (FIG. 8). The stop pins 32 secure the closure structure 14 firmly between L-shaped blocks 21 and the pins 32. A set screw 36 may be used to fix the stop pins 32 from vibrating loose during repeated reversals from pressure to vacuum.

When the O-ring groove 33 is located at the upper end of rim 18, internal operating pressure tends to squeeze it into the gap between surface 18 and the channel wall, and the inner surface 18 must be machined to close tolerances of size and concentricity so that the gap will be a uniform small value around the circumference of the closure member 14. FIG. 8B illustrates an inexpensive alternative to machining the entire surface of rim 18 to close tolerances. In this embodiment, surface 18 is either originally formed or subsequently rough machined undersized. A narrow peripheral band 37, preferably of stainless steel, is welded to rim 18 at the lower edge of the O-ring groove 33 and then finish machined to the necessary close tolerances. Alternatively, an equivalent band of the surface 18 may be left for finish machining and the remainder of the surface undercut during the rough machining step.

A disadvantage of the arrangements shown in FIGS. 8A and 8B is the exposure of the O-ring to possible thermal shock, requiring frequent O-ring replacement. The service life of O-ring 32 can be prolonged by locating the groove 33 at the outer edge of surface 18, as shown in FIG. 8C. In the arrangement of FIG. 8C, the O-ring 32 and stainless steel support ring 35 are positioned in groove 33 before closure structure 14 is lowered in place on sector blocks 21. The sector blocks 21 provide support for O-ring 33 by way of support ring 35. The O-ring 33 is more thermally isolated in the arrangement of FIG. 8C than in the arrangements of FIG. 8A or 8B.

Next, the procedure for insertion of elliptical lid 24 through manway 22 will be described with reference to FIGS. 6, 7, and 9–11. First, the installer of the closure structure 14 places an elliptical gasket 39 in place on circular seat 23, gaining access through manway opening 22. After the gasket is in place, an insertion apparatus 38 is used to insert manway lid 24. The insertion apparatus 38 rotates the elliptical manway lid 24 through an angle of 90° about a horizontal axis H for insertion through the elliptical opening 22 in the direction of arrow A (FIGS. 6 and 7). The minor diameter of manway cover 24 is in a plane transverse to the plane of the figures, as is the major diameter of opening 22. In FIG. 7, the major diameter of cover 24 is aligned in the direction of arrow A so that the cover is insertable through opening 24.

FIG. 9 shows a perspective cross-sectional view of the present closure apparatus in the same state of assembly as shown in FIG. 7. Solid lines are used to show the initial position of the lid, and dot-dashed lines show the lid rotated through the 90° angle for subsequent insertion. The automatic insertion apparatus 38 then vertically moves the elliptical lid 24 through the elliptical opening 22 in the closure structure 14 in the direction of arrow A.

After insertion, the lid 24 is rotated again about its horizontal axis H by 90°, and also rotated about a vertical axis by 90°, not necessarily in this order. Once the horizontal and vertical rotations are completed, the automatic insertion apparatus 38 lowers the elliptical lid 24 into place to rest on the elliptical gasket 39 on the seat 23 of the elliptical opening 22, as shown in FIG. 10, and is then detached from the lid (FIG. 11). Once the insertion apparatus 38 is removed, it is also desirable to secure the lid 24 in place by way of strongbacks and bolts (not shown).

To complete the installation of the closure apparatus 13, it may be desirable to supplement the O-ring seal of FIGS. 8A–8C by welding a ring seal 41 in the annular gap 40 between the exterior of closure member 14 and the channel wall 2 of vessel 1. FIG. 11 shows a conventional torus-type ring 41. Alternative embodiments will be discussed in connection with FIGS. 13 through 19.

FIG. 12 shows an alternative embodiment of the high pressure vessel closure apparatus 13 of FIG. 1. In the embodiment represented by FIG. 1 the closure member 14 has a hemispherical exterior contour except for a stepped cylindrical portion for adaptation to the flanged blocks 21. The alternative embodiment of FIG. 12 comprises a closure structure 14' having a stepped cylindrical exterior contour formed by an outer cylindrical surface 18', an annular shoulder 19' and a reduced cylindrical surface 20'. There is no exterior spherical contour portion; instead, the smaller diameter cylindrical surface 20' intersects a flat outer face 31'. The flat outer face 31' preferably is flush with annular end face 34 of the vessel 1.

FIG. 12 also shows an arrangement of stop pin 32 secured in hole 25 by a set screw 36 engaging a threaded hole in annular upper surface 18a of the closure member. The set screw assures that stop pin 32 will not work out of hole 25 as a result of repeated cycles between high pressure during plant operation and vacuum during cooldown.

Because the closure member of this embodiment has a flat outer face 31', it cannot provide a full hemispherical inner surface, and the channel needs to have more axial free space beyond the circumferential groove 13 to give enough room for access to install and remove the stop pins 32 and perform emergency repairs or routine maintenance inside the channel.

Figure 13:
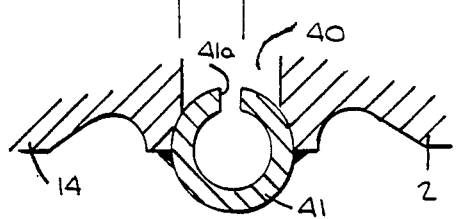
FIGS. 13-18 show alternative seals for the welded ring seal shown in FIGS. 11 and 12.

The previously-mentioned welded ring seals of FIGS. 11 and 13–19 can be used with either of the disclosed closure member embodiments. The torus-type ring 41 of FIG. 13 is a hoop-like tube having an annular slot 41a facing the annular gap 40 between the closure member and the channel wall. The slot permits the torus-type ring to flex in response to differential thermal expansion and contraction of the closure member with respect to the channel wall. In the event of leakage past the o-ring seal of FIGS. 8a–c, this slot also transmits pressure to the interior of the torus ring.

Figure 14:
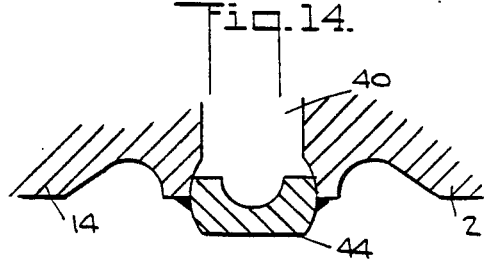

FIG. 14 shows a seal ring 44 having parallel faces and convex edges. The upper face of the ring has a semicircular groove. Like seal ring 41 shown in FIG. 13, the interior semicircular groove permits an even distribution of fluid pressure.

Figure 15:
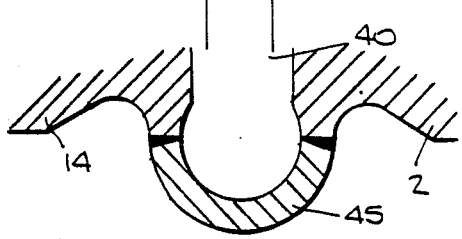

FIG. 15 shows a ring seal 45 of semicircular cross-section spanning the gap 40 between the closure member 14 and the lower end of channel portion 2. The edges of the ring are butt-welded to the two sides of the gap.

Figure 16:
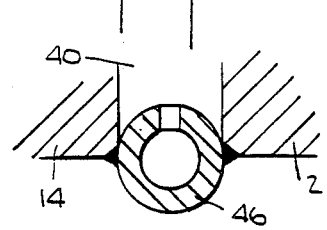

FIG. 16 shows a torus-type ring seal 46 comprising a metal tube substantially similar to the tube of FIG. 13 but having holes 46a longitudinally spaced along its inner circumference, instead of a continuous gap, for pressure distribution to its interior. Its crosssectional outer diameter is approximately the same as the width of the annular gap 40.

Figure 17:
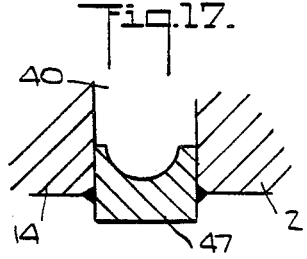

FIG. 17 shows a rectangular cross-section ring seal 47 having a semicircular interior groove similar to the embodiment of FIG. 14.

Figure 18:
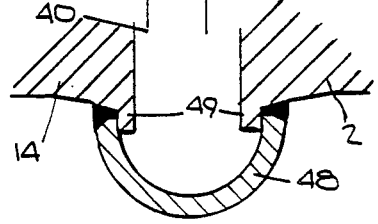
Figure 19:
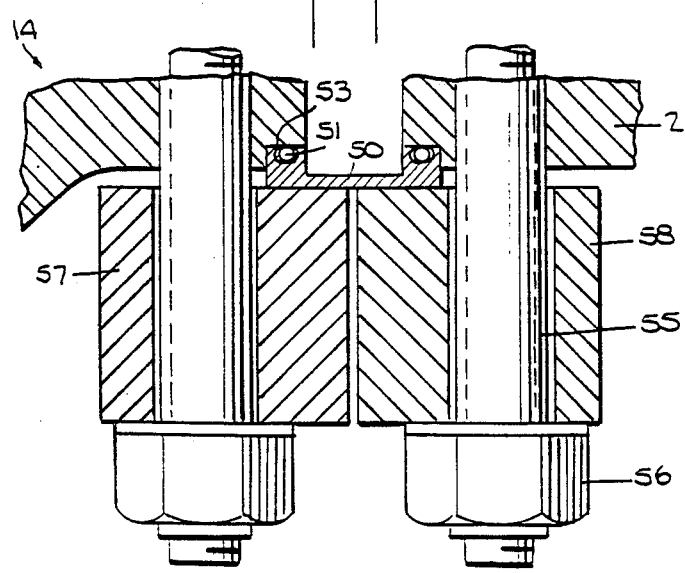
FIG. 19 shows another alternative seal substituting O-rings for the welded seal shown in FIG. 13.

FIG. 18 shows another ring seal 48 of semicircular cross-section similar to ring seal 45 in FIG. 15. Here, however, the interior semicircular contour of the ring seal 48 fits over lips 49 extending from the respective faces of the closure member 14 and the wall 2. Thus, the annular gap 40 and lips 49 are spanned by ring seal 48.

Finally, in FIG. 20, a metal seal ring 50 has a U-shaped cross section that bridges the gap between the closure 14 and the channel wall 2. Each leg of the U has an O-ring 51, 52 in a respective O-ring groove 53, 54. The cross-sectional shape of each O-ring groove is in accordance with the teaching of U.S. Pat. No. 4,463,871 and will not be described in greater detail here. Studs 55 and nuts 56 secure metal seal ring 50 in place by means of backing rings 57 and 58. This arrangement avoids the need for a welded seal.

It will be apparent to those skilled in the art that the principles of the invention as described can be applied to other physical arrangements, and it is not intended to limit the scope of the invention to the specific embodiments shown by way of example.

What is claimed is:

1. Closure apparatus for a high pressure vessel having a cylindrical interior channel wall including a circumferential groove, the closure apparatus comprising:
   a closure member and
   a plurality of flanged sector blocks,
   the closure member having an outer rim adapted to slidably engage the cylindrical interior channel wall of the vessel upon insertion into the vessel, a hemispherically concave interior surface, and a stepped cylindrical exterior portion complementing the flanged sector blocks,
   the plurality of flanged sector blocks each having a flange portion for insertion into the circumferential groove of the cylindrical interior channel wall and for supporting the closure member and a lengthwise portion with an exterior surface for engaging the cylindrical interior channel wall and an interior surface for engaging the stepped cylindrical exterior portion of the closure member, such that the closure member, after insertion and upon lowering into a final position, lockingly engages the flanged sector blocks without any requirement for a locking wedge ring.

2. The closure apparatus of claim 1, wherein the flanged sector blocks have a substantially L-shaped cross section.

3. The closure apparatus of claim 1, wherein the closure member is provided with an elliptical opening in a bottom wall, an interior seating surface surrounding the elliptical opening, and the closure apparatus further comprises an elliptical lid having a greater circumference than the circumference of the elliptical opening, the lid being insertable through and sealingly engageable with the interior seating surface.

4. The closure apparatus of claim 3 wherein the elliptical opening in the bottom of the closure member is sufficiently large to permit human access to the interior of the vessel.

5. The closure apparatus of claim 3 further comprising means for inserting the elliptical lid through the elliptical opening, for rotating the lid through an approximate 90° arc about a longitudinal axis of the cylindrical channel, and for rotating the lid through an approximate 90° arc about a horizontal axis with respect to the channel.

6. The closure apparatus of claim 1 further comprising a plurality of stop pins for securing the closure structure between the pins and the supporting cross members of the plurality of respective flanged sector blocks, the cylindrical interior channel wall of the vessel being adapted to receive the stop pins.

7. The closure apparatus of claim 1 further comprising a torus ring welded on both sides of an annular gap between the closure structure and the cylindrical channel wall of the high pressure vessel.

8. The closure apparatus of claim 1 further comprising an O-ring for sealing an annular gap between the closure structure and the cylindrical channel wall of the high pressure vessel.

9. The closure apparatus of claim 1, wherein the outer rim of the closure structure has an annular groove for seating an O-ring for sealing the annular gap between the cylindrical interior channel wall and the outer rim.

10. The closure apparatus of claim 9, wherein the annular O-ring groove intersects an interior face of the closure member, and the cylindrical interior channel wall of the vessel has at least one recess for insertion of a stop pin, the closure apparatus further comprising at least one stop pin having a threaded recess for a set screw, a set screw, and a guard ring insertable into the O-ring groove, such that when the stop pin is inserted in the channel wall recess, the set screw enters the O-ring groove, thereby securing the stop pin in the channel wall recess.

11. Closure apparatus for an access channel of a high pressure vessel, the channel having a cylindrical internal surface extending axially inward for a minimum predetermined distance from an outer opening, the cylindrical internal surface being formed with a circumferential groove adjacent to the outer opening, the closure apparatus comprising:
   a circular closure member having an interior surface, an exterior surface, and a peripheral portion including a first outer cylindrical rim extending from a forward edge intersecting the interior surface to a rearward edge and engageable with the cylindrical internal surface of the access channel, an annular shoulder extending radially inward from the rearward edge of the cylindrical rim, and a second cylindrical surface having a diameter smaller than the diameter of the cylindrical rim and extending from the annular shoulder to intersect the exterior surface of the closure member at a second rearward edge, and a manway access passage extending axially through the closure member from the exterior surface to the interior surface;
   a plurality of arcuate flanged sector blocks for locking the closure member within the access channel, each sector block having a cylindrical sector portion and an annular sector flange portion extending radially outward from the cylindrical sector portion such that the block has an L-shaped cross section, the annular sector flange portion fitting snugly in the circumferential groove of the access channel and the cylindrical sector portion fitting snugly between the cylindrical internal surface of the access channel and the second cylindrical surface of the closure member when the closure member is inserted into the channel with the annular shoulder of the rim abutting the sector blocks.

12. Closure apparatus according to claim 11 wherein the interior surface of the member is concave, and the closure member has an elliptical access passage, the interior surface forming a seat surrounding the access passage, the closure apparatus further comprising an elliptic pressure cover for closing the access passage, the pressure cover having a seat that fits against the seat surrounding the access passage, whereby positive internal pressure acts to hold the elliptical cover on the interior seat surrounding the access passage.

* * * * *